United States Patent
Passi et al.

(10) Patent No.: US 11,881,875 B1
(45) Date of Patent: Jan. 23, 2024

(54) WAVEFORM GENERATOR USING A WAVEFORM CODING SCHEME FOR BOTH LONG STATES AND TOGGLE STATES

(71) Applicant: STMicroelectronics S.r.l., Agrate Brianza (IT)

(72) Inventors: Stefano Passi, Pavia (IT); Roberto Giorgio Bardelli, Fino Mornasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/895,671

(22) Filed: Aug. 25, 2022

(51) Int. Cl.
*H04B 1/04* (2006.01)
*H04B 11/00* (2006.01)

(52) U.S. Cl.
CPC ............... *H04B 1/04* (2013.01); *H04B 11/00* (2013.01)

(58) Field of Classification Search
CPC .................................. H04B 1/04; H04B 11/00
See application file for complete search history.

(56) References Cited

U.S. PATENT DOCUMENTS

| | | | |
|---|---|---|---|
| 6,674,895 B2 | 1/2004 | Rafii et al. | |
| 7,486,591 B2 * | 2/2009 | Rooney, III | ............ G01S 7/524 367/137 |
| 10,492,765 B2 | 12/2019 | Passi | |
| 2001/0045883 A1 * | 11/2001 | Holdaway | ................ H04B 1/04 102/275.9 |
| 2007/0239001 A1 | 10/2007 | Mehi et al. | |
| 2011/0251968 A1 * | 10/2011 | Parker | .................. G06Q 50/265 705/317 |
| 2015/0301165 A1 * | 10/2015 | Rothberg | ............. G10K 11/346 367/117 |
| 2018/0177494 A1 | 6/2018 | Bardelli et al. | |
| 2018/0310913 A9 | 11/2018 | Chiang et al. | |
| 2019/0324132 A1 | 10/2019 | Rothberg et al. | |
| 2020/0025920 A1 | 1/2020 | Hu et al. | |
| 2021/0052256 A1 | 2/2021 | Berger et al. | |
| 2021/0270950 A1 | 9/2021 | Passi et al. | |

\* cited by examiner

*Primary Examiner* — Daniel L Murphy
*Assistant Examiner* — Amie M Ndure
(74) *Attorney, Agent, or Firm* — Crowe & Dunlevy

(57) ABSTRACT

A memory includes a sequence of memory locations storing a corresponding sequence of state codes that specifying the shape of a waveform. The sequence of state codes is read from the memory and decoded by a long and toggle decoder circuit. The decoding operation generates a sequence of signal codes. When the state code is a long code, the sequence of signal codes includes same signal codes corresponding to a signal level of the waveform. When the state code is a toggle code, the sequence of signal codes includes a first signal code corresponding to one signal level of the waveform and a second signal code corresponding to another signal level of the waveform. A signal decode circuit then decodes the signal codes in the sequence of signal codes to generate the waveform for output which includes the signal levels corresponding to the decoded signal codes.

12 Claims, 3 Drawing Sheets

WAVEFORM GENERATOR USING A WAVEFORM CODING SCHEME FOR BOTH LONG STATES AND TOGGLE STATES

TECHNICAL FIELD

Embodiments herein relate to a waveform generator. In particular, the waveform generator is well-suited for use in generating a waveform signal that is applied to a transducer in an ultrasound imaging system.

BACKGROUND

Reference is made to FIG. 1 which shows a basic block diagram for a transmitter of an ultrasound imaging system 10. A plurality of transducer elements 12 generate acoustic signals 14 in response to delay-controlled waveform signals 16. The waveform signals 16 are generated by a waveform generator 18 and supplied to a high voltage analog pulse driver (D) circuit 20 coupled to each transducer element 12 that performs signal level shifting operations on the received waveform signal 16. The waveform generator 18 includes a memory circuit and a beamforming circuit. The memory circuit stores digital waveform data representing the shapes of various waveform signals. The beamforming circuit reads the digital data from the memory, decodes the digital data to determine waveform state and generates the corresponding waveform signal 16. The beamforming circuit further receives a delay control signal 22 generated by a delay control circuit 24. The delay control signal 22 specifies a relative delay to be applied by the beamforming circuit in supplying the waveform signals 16 to the analog pulse driver circuits 20 for amplification and application to their corresponding transducer elements 12 for generating the acoustic signal 14. Responsive to the delay control signal 22, the beamforming circuit produces different delayed internal triggers that are used to start read operations to retrieve the digital waveform data from the memory and perform state decoding with a proper relative delay between the waveform signal channels. The delay control signal 22 is generated by the delay control circuit 24 in response to a direction signal 26 that specifies an angle Θ for an imaging direction for the wavefront 28 of the acoustic signals 14.

Each waveform signal 16 is a pulsed analog voltage signal defined by a sequence of waveform steps, wherein each step is defined (at least in part) by a signal state (or value such as a voltage level). In one case, the waveform step states may be binary (i.e., there are two states: high and low, for example). In another case, the waveform step states may be ternary (i.e., there are three states: high, intermediate and low, for example). More generally speaking, the waveform step states may be m-ary (i.e., there are m distinct states or levels). FIG. 2 illustrates an example of an N step (where N=8) ternary waveform signal 16. The three states possible at each waveform step in FIG. 2 include a positive (high) voltage state (HV+), an intermediate clamp state (CLP) and a negative (high) voltage state (HV−).

There is a need in the art to be able to exercise minimum timing resolution and maximum signal shaping flexibility with respect to the generation of the waveform signal 16 relative to a system clock CLK.

SUMMARY

In an embodiment, a waveform generator comprises: a memory including a plurality of memory locations, wherein a sequence of memory locations within said plurality of memory locations stores a corresponding sequence of state codes specifying a waveform, where said sequence of state codes is read from the memory; a long and toggle decoder circuit configured to decode each state code in the sequence of state codes read from the memory and generate a sequence of signal codes, wherein: when the state code is a long code, the sequence of signal codes includes same signal codes corresponding to a signal level of the waveform; and when the state code is a toggle code, the sequence of signal codes includes a first signal code corresponding to one signal level of the waveform and a second signal code corresponding to another signal level of the waveform; and a signal decode circuit configured to decode the signal codes in the sequence of signal codes generated by the long and toggle decoder circuit and generate the waveform for output to include the signal levels corresponding to the decoded signal codes.

In an embodiment, a transducer is driven by the signal levels of the waveform generated by the waveform generator.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
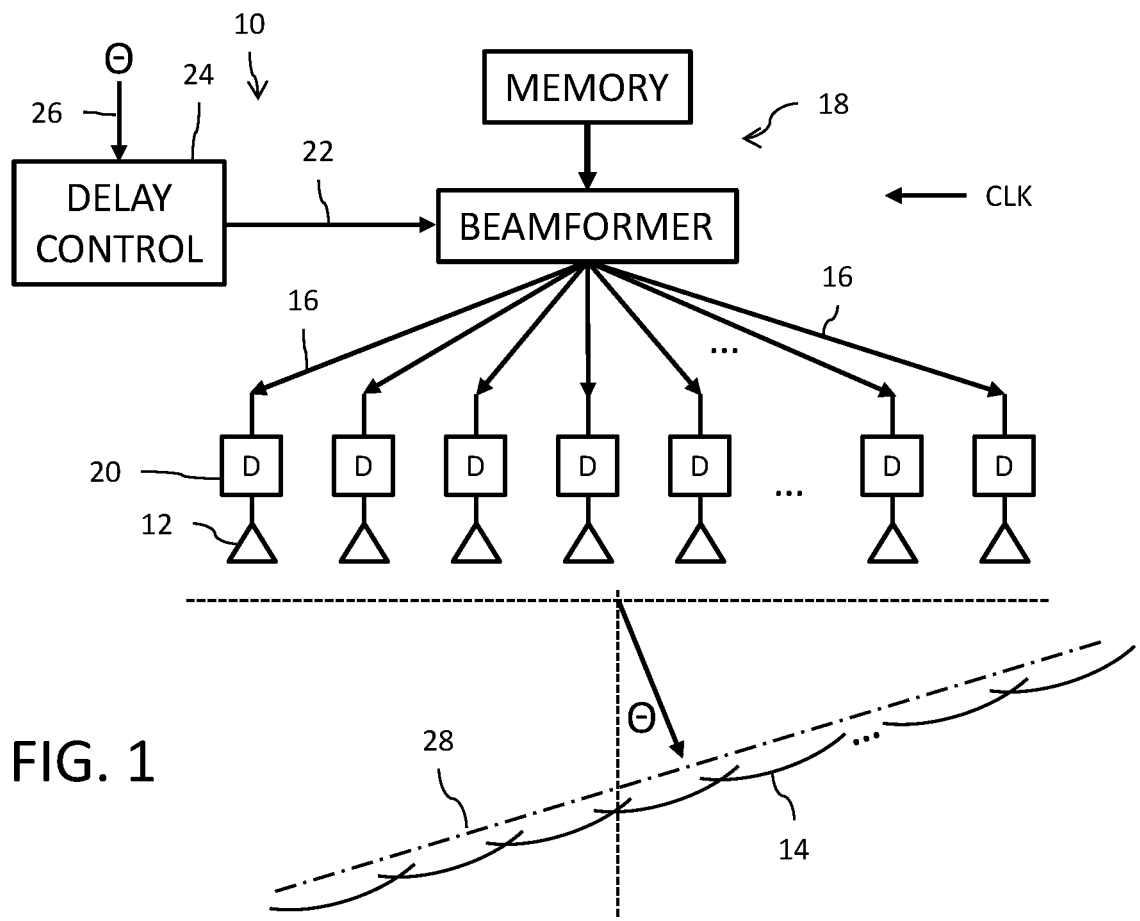
FIG. 1 is a basic block diagram for a transmitter of an ultrasound imaging system.
Figure 3:
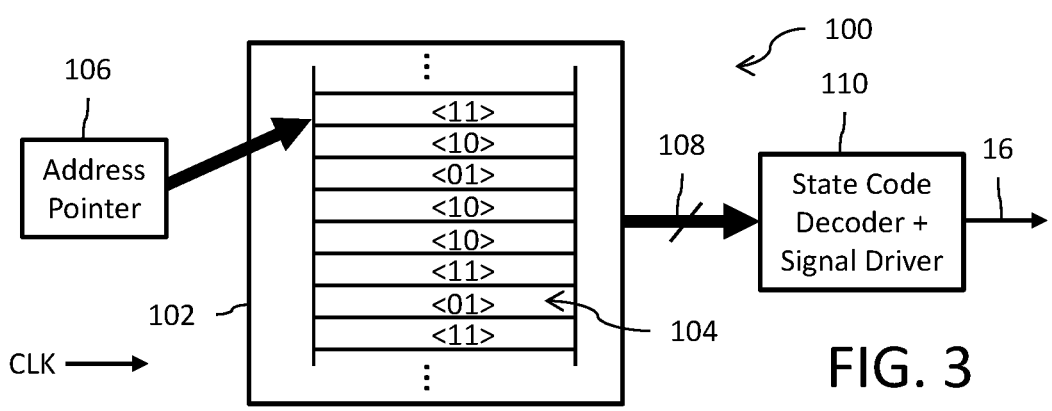
FIG. 3 is a block diagram of a waveform generator.

Reference is now made to FIG. 3 which shows a block diagram for an implementation of a waveform generator 100 (for example, such as could be used for waveform generator 18 in FIG. 1). The waveform generator 100 includes a memory circuit 102. The memory circuit 102 includes a plurality of addressable data locations 104. For example, each data location 104 may correspond to a row of memory cells in the memory circuit 102. Each addressable data location 104 stores a plurality of data bits that define, at least, the signal state of a waveform step using a code. A sequence of consecutive addressable data locations 104 in the memory circuit 102 include a data field storing data bits (referred to herein as the "state codes") defining the m-ary signal states for a plurality of consecutive waveform steps in a given waveform signal 16. An address pointer 106 sequentially points to the addressable data locations 104 storing the waveform signal and the data bits stored at the addressed data locations 104 are read from the memory circuit 102 and output as a sequence of state codes 108. Each state code 108 in the sequence is decoded by a decoding function of circuit 110 and a signal generating function of circuit 110 responds to the decoded state code to generate a corresponding analog signal level for the corresponding waveform step in the waveform signal 16. The generated waveform signal 16 is supplied to the high voltage analog pulse driver circuit 20 (see, FIG. 1) to be level shifted in connection with driving the associated transducer 12.

Figure 2:
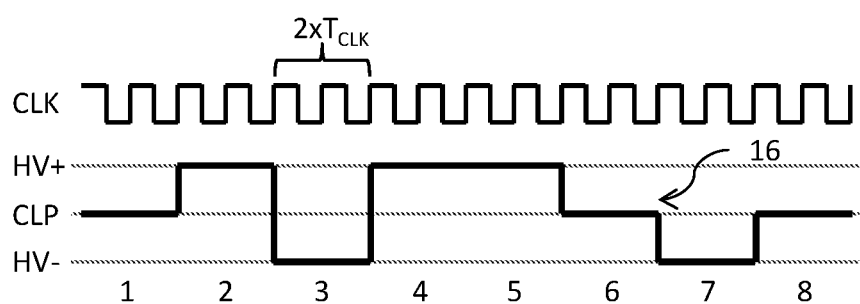
FIG. 2 illustrates an example of a multi-step ternary waveform signal.

The memory data locations 104 shown in FIG. 3 illustrate N (where N=8) sequentially addressable data locations storing the state code data bits for the example waveform signal shown in FIG. 2. It will be understood that the memory circuit 102 may include many more than N data locations 104, and that more than one sequence of state codes 108 can be stored in the memory circuit 102. Because the waveform signal is of a ternary type, only two bits are needed to code the three possible signal states for each step (where, for example, the data bits <10> code the positive (high) voltage state (HV+), the data bits <11> code the intermediate clamp state (CLP), and the data bits <01> code the negative (high) voltage state (HV−)). So, in the context of the example waveform signal 16 shown in FIG. 2, the first data location 104 in the sequence stores state code <11> for the intermediate clamp state of signal step 1, the second data location 104 in the sequence stores state code <10> for the positive (high) voltage state of signal step 2, the third data location 104 in the sequence stores state code <01> for the negative (high) voltage state of signal step 3, . . . , and the eighth data location 104 in the sequence stores state code <11> for the intermediate clamp state of signal step 8.

With reference once again to FIG. 1, the ultrasound imaging system 10 operates in accordance with a system clock CLK at a desired operating frequency. Due to technology limitations related to the time required to read from the memory 102 as well as the implementation of state repetition and state time duration processing for the waveform, the generation of each step of the signal 16 can take longer than one period T of the system clock. As a result, the minimum width for each step of the waveform signal 16 is two-times the period T of the system clock (i.e., $2 \times T_{CLK}$, see FIG. 2). Thus, sequential accesses of the memory circuit 102 to read state code data bits occur once every two clock cycles (i.e., at a memory access rate equal to one-half the system clock CLK rate). Because of this, it is not possible to generate a waveform signal 16 step with a width of one system clock period T (or that is an odd multiple of the system clock period T). As shown in FIG. 2, only steps having a minimum width of two times the system clock period T (or that is an even multiple of the system clock period T) is possible.

Figure 4:
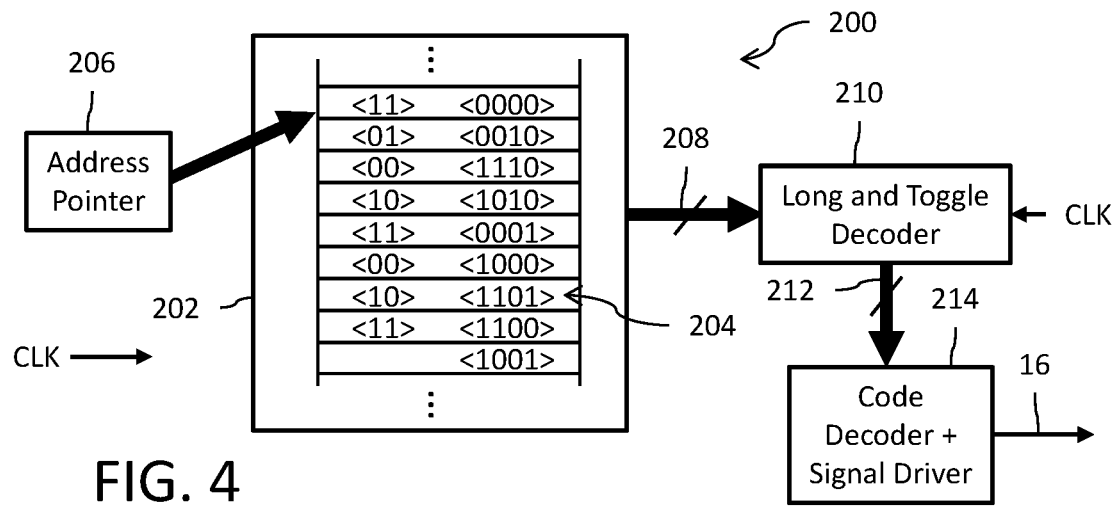
FIG. 4 is a block diagram of a further embodiment of the waveform generator.

In order to provide for minimum timing resolution and maximum signal shaping flexibility in the generation of the signal 16, there is a need to generate steps of the waveform signal 16 whose width can be any integer multiple (odd or even) of the system clock period T, and in particular can have a width equal to one system clock period T. FIG. 4 shows a block diagram for an implementation of a waveform generator 200 (for example, such as could be used for waveform generator 18 in FIG. 1) to support, notwithstanding the above-noted technology limitations, steps of the waveform signal 16 whose width can be any integer multiple (odd or even) of the system clock period T.

The waveform generator 200 includes a memory circuit 202. The memory circuit 202 includes a plurality of addressable data locations 204. For example, each data location 204 may correspond to a row of memory cells in the memory circuit 202. Each addressable data location 204 stores a data field including data bits that define, at least, a plurality of long signal states of a waveform step and at least one toggle signal state of a waveform step. The difference between the long signal state and the toggle signal state for a waveform step will be described in detail below. A sequence of consecutive addressable data locations 204 in the memory circuit 202 may store data bits (referred to herein as the "state codes") defining the long and toggle signal states for a plurality of waveform steps in a given waveform signal 16. An address pointer 206 sequentially points to the addressable data locations 204 for the waveform signal and the data bits stored at the addressed data locations 204 are read from the memory circuit 202 and output as a sequence of state codes 208 at a rate of one state code for every two cycles of the system clock CLK. The state codes 208 in the sequence output from the memory at a rate of one code per two clock cycles are decoded by a long and toggle decoder circuit 210 as a function of the system clock CLK signal to generate a sequence of signal codes 212 at a rate of one signal code per clock cycle of the system clock CLK. Each of the signal codes 212 in the sequence is decoded by a code decoding function of circuit 214 and a signal driver function of circuit 214 generates from each decoded signal code a corresponding analog signal level for the waveform signal 16. The generated waveform signal 16 is supplied to the high voltage analog pulse driver circuit 20 (see, FIG. 1), in accordance with the delay specified by the beamforming circuit, to drive its associated transducer 12.

Figure 5:
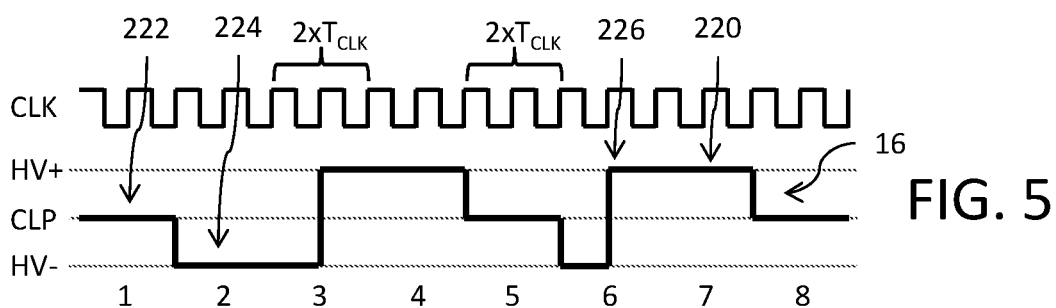
FIG. 5 illustrates an example of a multi-step ternary waveform signal.

FIG. 5 illustrates an example of an N step (where N=8) ternary waveform signal 16. The waveform signal is similar to the waveform signal of FIG. 2 in the inclusion of three long signal states for the waveform steps. These long signal states include a positive (high) voltage state (HV+) over two clock periods (reference 220), an intermediate clamp state (CLP) over two clock periods (reference 222) and a negative (high) voltage state (HV−) over two clock periods (reference 224). The waveform signal 16 of FIG. 5 further includes a toggle signal state (reference 226) for a waveform step wherein there is toggling from the negative (high) voltage state (HV−) during a first clock period of the step to the positive (high) voltage state (HV+) during a second clock period of the step.

The use of two bits for the state code allows for the coding of the three long signal states and one toggle signal state for each step (where, for example, the data bits <10> code the positive (high) voltage long signal state (HV+), the data bits <11> code the intermediate clamp long signal state (CLP), the data bits <01> code the negative (high) voltage long signal state (HV−), and the data bits <00> code the negative-to-positive (high) voltage toggle state (HV−/HV+)). So, in the context of the example waveform signal shown in FIG. 5, and with reference to the left side of the memory 202 in FIG. 4, the first data location 104 in the sequence stores state code <11> for the intermediate clamp long signal state of step 1 in the signal 16, the second data location 104 in the sequence stores state code <01> for the negative (high) voltage long signal state of step 2 in the signal 16, the third data location 104 in the sequence stores state code <00> for the negative-to-positive (high) voltage toggle signal state of step 3, the fourth data location 104 in the sequence stores state code <10> for the positive (high) voltage long signal state of step 4 in the signal 16, the fifth data location 104 in the sequence stores state code <11> for the intermediate clamp long signal state of step 5 in the signal 16, the sixth data location 104 in the sequence stores state code <00> for the negative-to-positive (high) voltage toggle signal state of step 6, the seventh data location 104 in the sequence stores state code <10> for the positive (high) voltage state of step 7 in the signal 16, and the eighth data location 104 in the sequence stores state code <11> for the intermediate clamp long signal state of step 8 in the signal 16.

In the instance of this example using a two bit state code for coding three long signal states and one toggle signal state for each step, the long and toggle decoder circuit 210 operates as follows. In response to receipt of the state code <10> 208 for the positive (high) voltage long signal state, two consecutive single clock cycle signal codes <10> 212 indicative of a positive (high) voltage for signal 16 are output by the circuit 210. Likewise, in response to receipt of the state code <11> 208 for the intermediate clamp long signal state, two consecutive single clock cycle signal codes <11> 212 indicative of a clamp voltage for the signal are output. Also, in response to receipt of the state code <01> 208 for the negative (high) voltage long signal state, two consecutive single clock cycle signal codes <01> 212 indicative of a negative (high) voltage for the signal 16 are output. In response to receipt of the state code <00> 208 for the negative-to-positive (high) voltage toggle signal state, however, the first decoder circuit 210 will output a single clock cycle signal code <01> 212 immediately followed by a single clock cycle signal code <10> 212 indicative of a toggling of the signal 16 from the negative (high) voltage (lasting for one clock cycle) to the positive (high) voltage (lasting for one clock cycle).

The circuit 214 receives the sequence of signal codes 212 from the long and toggle decoder circuit 210. In response to each decoding of the signal code <10> 212, the signal driver function of circuit 214 generates a positive (high) voltage for signal 16 having a duration of one clock cycle. In response to each decoding of the signal code <11> 212, the signal driver function of circuit 214 generates a clamp voltage for signal 16 having a duration of one clock cycle. In response to each decoding of the signal code <01> 212, the signal driver function of circuit 214 generates a negative (high) voltage for signal 16 having a duration of one clock cycle.

Figure 6:
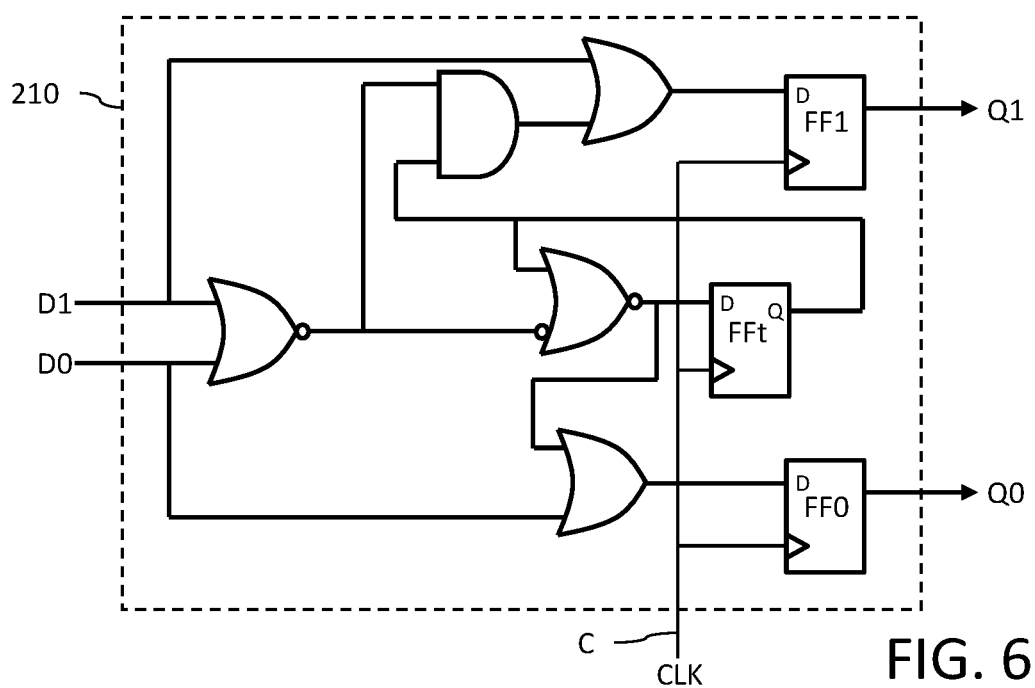
FIG. 6 illustrates a logic circuit diagram for a decoder circuit.

Reference is now made to FIG. 6 for a circuit diagram of the long and toggle decoder circuit 210 implemented to support the example of a two bit state code which codes three long signal states and one toggle signal state for each step. The two bits of the state codes 208 are received at input nodes D0 and D1. The two bits of the signal codes 212 are output at output nodes Q0 and Q1. The system clock CLK is received at a clock input node C. The combinational logic provided by the AND, OR, NOR and NOT logic gates functions to decode the two bits of the state code 208. In the cases where the two bits of the state code 208 are coding any of the three long signal states (HV+, HV−, CLP), the logic state of the bits at input nodes D0 and D1 are passed by the combinational logic and latched by the state flip flops FF0 and FF1 to be held as the two bits of the signal code 212 over two consecutive cycles of the clock CLK. However, where the two bits of the state code 208 are coding the toggle signal state (HV+/HV−), in other words when the state code is <00>, this is detected by the input NOR logic gate of the combinational logic. In a first clock cycle of the clock CLK, the logic states "1" and "0" are generated by the combinational logic (in response the logic "1" at the output of the input NOR gate) and latched by the state flip flops FF0 and FF1, respectively, to be held as the two bits of the second state code 212. The clocking of the toggle flip flop FFt causes the output of the toggle flip flop FFt to change from logic "0" to logic "1" which indicates that a toggle operation is to be performed for the second clock cycle. In response to the second cycle of the clock CLK and the logic "1" output of the toggle flip flop FFt, the output of the AND gate changes to logic "1" and the input to FF1 also changes to logic "1". Feedback of the logic "1" output from the toggle flip flop FFt is passed by the feedback NOR gate to cause a reset of the toggle flip flop FFt output to logic "0". This also causes the input to FF0 to change to logic "0". The combinational logic thus generates the logic states "0" and "1" to be latched by the state flip flops FF0 and FF1, respectively, and held as the two bits of the second state code 212.

The following Table illustrates operation of the circuit 210 for steps 2-6 of the FIG. 5 waveform signal 16, where the left-most column identifies the signal nodes and the remaining columns each correspond to one cycle of the clock CLK:

|        | Step 2 |     | Step 3 |     | Step 4 |     | Step 5 |     | Step 6 |     |
| ------ | ------ | --- | ------ | --- | ------ | --- | ------ | --- | ------ | --- |
| D1     | 0      | 0   | 0      | 0   | 1      | 1   | 1      | 1   | 0      | 0   | 0   |
| D0     | 1      | 1   | 0      | 0   | 0      | 0   | 1      | 1   | 0      | 0   | 1   |
| FFt(D) | 0      | 0   | 1      | 0   | 0      | 0   | 0      | 1   | 0      | 0   |     |
| FFt(Q) | X      | 0   | 0      | 1   | 0      | 0   | 0      | 0   | 1      | 0   |     |
| FF1(D) | 0      | 0   | 0      | 1   | 1      | 1   | 1      | 1   | 0      | 1   | 0   |
| FF0(D) | 1      | 1   | 1      | 0   | 0      | 0   | 1      | 1   | 1      | 0   | 1   |
| FF1(Q1)| X      | 0   | 0      | 0   | 1      | 1   | 1      | 1   | 1      | 0   | 1   |
| FF0(Q0)| X      | 1   | 1      | 1   | 0      | 0   | 0      | 1   | 1      | 1   | 0   |
| 16     |        | HV− |        | HV− | HV+    | HV+ | CLP    |     | HV−    | HV+ |     |

In a situation where the addressable data locations 204 in the memory circuit 202 can store more than two bits for the state code, it is possible to define additional toggle signal states. Take, for example, the use of four bits for the state code. This will permit defining the three long signal states (HV+, HV−, CLP) as well as six distinct toggle signal states. These toggle signal states may include, for example, a negative-to-positive (high) voltage toggle signal state, a positive-to-negative (high) voltage toggle signal state, an intermediate clamp-to-negative (high) voltage toggle signal state, a negative (high) voltage-to-intermediate clamp toggle signal state, an intermediate clamp-to-positive (high) voltage toggle signal state, and a positive (high) voltage-to-intermediate clamp toggle signal state.

Figure 7:
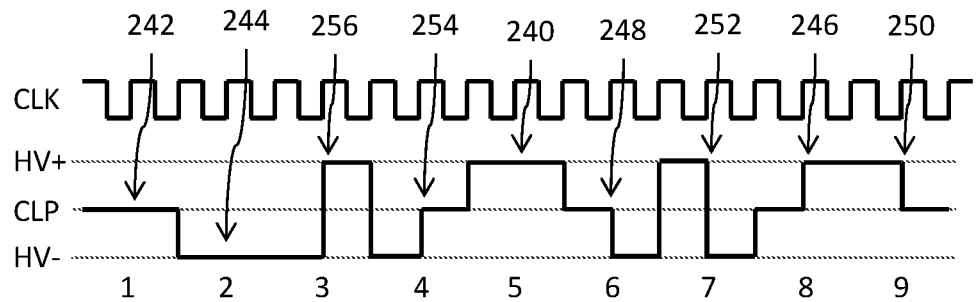
FIG. 7 illustrates an example of a multi-step ternary waveform signal.

FIG. 7 illustrates an example of an N step (where N=9) ternary waveform signal 16 that utilizes all nine of the signal states.

The use of four bits for the state code 208 allows for the coding of the three long signal states and five toggle signal state for each step (where, for example, data bits <0001> code the positive (high) voltage long signal state (HV+), data bits <0000> code the intermediate clamp long signal state (CLP), data bits <0010> code the negative (high) voltage long signal state (HV−), data bits <1100> code the intermediate clamp-to-positive (high) voltage toggle signal state (CLP/HV+), data bits <1000> code the intermediate clamp-to-negative (high) voltage toggle signal state (CLP/HV−), data bits <1001> code the positive (high) voltage-to-intermediate clamp toggle signal state (HV+/CLP), data bits <1101> code the positive-to-negative (high) voltage toggle signal state (HV+/HV−), data bits <1010> code the negative (high) voltage-to-intermediate clamp toggle signal state (HV−/CLP), and data bits <1110> code the negative-to-positive (high) voltage toggle state (HV−/HV+)).

So, in the context of the example waveform signal shown in FIG. 7, and with reference to the right side of the memory 202 in FIG. 4, the first data location 104 in the sequence stores state code <0000> 208 for the intermediate clamp long signal state of step 1 in the signal 16, the second data location 104 in the sequence stores state code <0010> 208 for the negative (high) voltage long signal state of step 2 in the signal 16, the third data location 104 in the sequence stores state code <1110> 208 for the negative-to-positive (high) voltage toggle state of step 3 in the signal 16, the fourth data location 104 in the sequence stores state code <1010> 208 for the negative (high) voltage-to-intermediate clamp toggle signal state of step 4 in the signal 16, the fifth data location 104 in the sequence stores state code <0001> 208 for the positive (high) voltage long signal state of step 5 in the signal 16, the sixth data location 104 in the sequence stores state code<1000> 208 for the intermediate clamp-to-negative (high) voltage toggle signal state of step 6 in the signal 16, the seventh data location 104 in the sequence stores state code <1101> 208 for the positive-to-negative (high) voltage toggle signal state of step 7 in the signal 16, the eighth data location 104 in the sequence stores state code <1100> 208 for the intermediate clamp-to-positive (high) voltage toggle signal state of step 8 in the signal 16, and the ninth data location 104 in the sequence stores state code <1001> 208 for the positive (high) voltage-to intermediate clamp toggle signal state of step 9 in the signal 16.

In the instance of this example using a four bit state code 208 for coding three long signal states and six toggle signal state for each step, the first decoder circuit 210 operates as follows. In response to receipt of the state code <0001> 208 for the positive (high) voltage long signal state (HV+), two consecutive single clock cycle signal codes <01> 212 indicative of a positive (high) voltage for signal 16 are output (see, FIG. 7 reference 240) by the first decoder circuit 210. Likewise, in response to receipt of the state code <0000> 208 for the intermediate clamp long signal state (CLP), two consecutive single clock cycle signal codes <00> 212 indicative of a clamp voltage for the signal are output (see, FIG. 7 reference 242). Also, in response to receipt of the state code <0010> 208 for the negative (high) voltage long signal state (HV-), two consecutive single clock cycle signal codes <10> 212 indicative of a negative (high) voltage for the signal 16 are output (see, FIG. 7 reference 244).

Turning next to the toggle operation, in response to receipt of the state code <1100> 208 for the intermediate clamp-to-positive (high) voltage toggle signal state (CLP/HV+), the first decoder circuit 210 will output (see, FIG. 7 reference 246) a single clock cycle signal code <00> 212 immediately followed by a single clock cycle signal code <01> 212 indicative of a toggling of the signal 16 from the clamp voltage (lasting for one clock cycle) to the positive (high) voltage (lasting for one clock cycle). In response to receipt of the state code <1000> 208 for the intermediate clamp-to-negative (high) voltage toggle signal state (CLP/HV-), the first decoder circuit 210 will output (see, FIG. 7 reference 248) a single clock cycle signal code <00> 212 immediately followed by a single clock cycle signal code <10> 212 indicative of a toggling of the signal 16 from the clamp voltage (lasting for one clock cycle) to the negative (high) voltage (lasting for one clock cycle). In response to receipt of the state code <1001> 208 for the positive (high) voltage-to-intermediate clamp toggle signal state (HV+/CLP), the first decoder circuit 210 will output (see, FIG. 7 reference 250) a single clock cycle signal code <01> 212 immediately followed by a single clock cycle signal code <00> 212 indicative of a toggling of the signal 16 from the positive (high) voltage (lasting for one clock cycle) to the clamp voltage (lasting for one clock cycle). In response to receipt of the state code <1101> 208 for the positive-to-negative (high) voltage toggle signal state (HV+/HV-), the first decoder circuit 210 will output (see, FIG. 7 reference 252) a single clock cycle signal code <01> 212 immediately followed by a single clock cycle signal code <10> 212 indicative of a toggling of the signal 16 from the positive (high) voltage (lasting for one clock cycle) to the negative (high) voltage (lasting for one clock cycle). In response to receipt of the state code <1010> 208 for the negative (high) voltage-to-intermediate clamp toggle signal state (HV-/CLP), the first decoder circuit 210 will output (see, FIG. 7 reference 254) a single clock cycle signal code <10> 212 immediately followed by a single clock cycle signal code <00> 212 indicative of a toggling of the signal 16 from the negative (high) voltage (lasting for one clock cycle) to the clamp voltage (lasting for one clock cycle). Lastly, in response to receipt of the state code <1110> 208 for the negative-to-positive (high) voltage toggle state (HV-/HV+), the first decoder circuit 210 will output (see, FIG. 7 reference 256) a single clock cycle signal code <10> 212 immediately followed by a single clock cycle signal code <01> 212 indicative of a toggling of the signal 16 from the negative (high) voltage (lasting for one clock cycle) to the positive (high) voltage (lasting for one clock cycle).

The circuit 214 receives the sequence of signal codes 212 from the long and toggle decoder circuit 210. In response to each decoding of the signal code <01> 212, the signal driver function of circuit 214 generates a positive (high) voltage for signal 16 having a duration of one clock cycle. In response to each decoding of the signal code <00> 212, the signal driver function of circuit 214 generates a clamp voltage for signal 16 having a duration of one clock cycle. In response to each decoding of the signal code <10> 212, the signal driver function of circuit 214 generates a negative (high) voltage for signal 16 having a duration of one clock cycle. It will be noted that signal state 212 decoding operation for the four bit state code 208 implementation is different than the signal state 212 decoding operation for the two bit state code 208 implementation.

Figure 8:
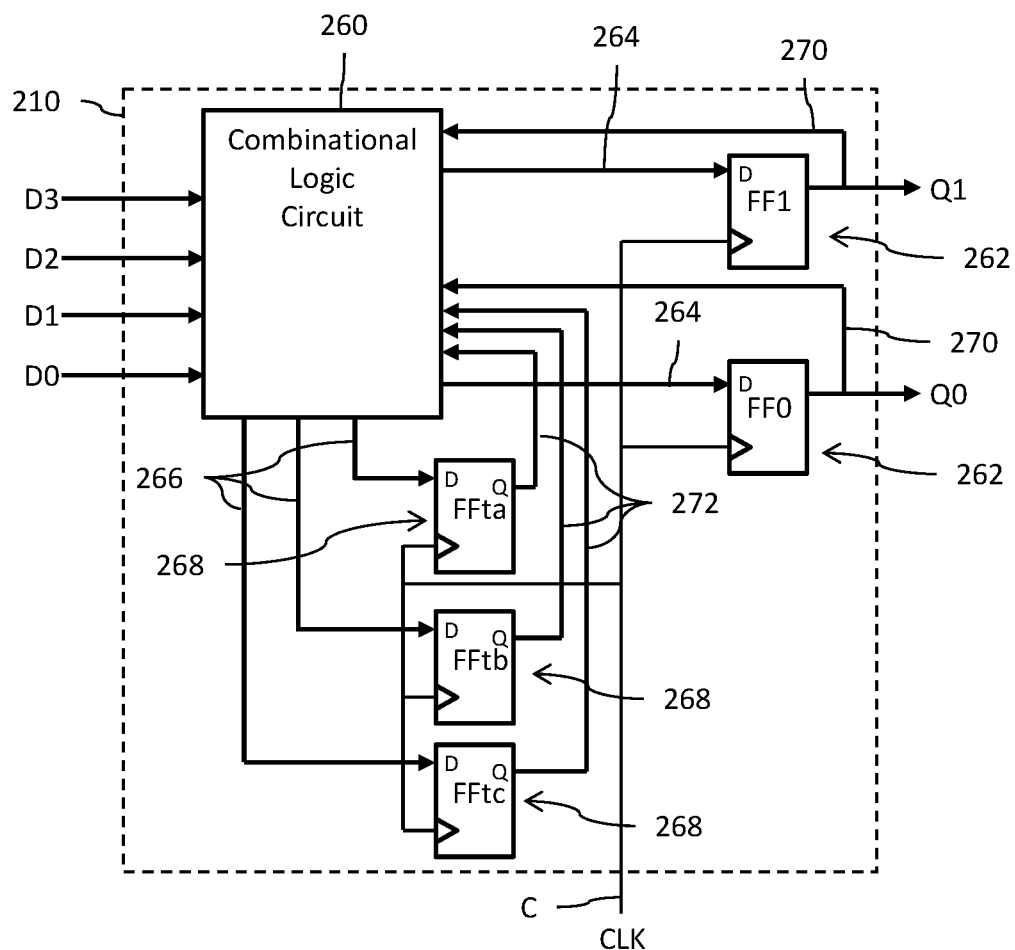
FIG. 8 illustrates a block diagram for a decoder circuit.

Reference is now made to FIG. 8 for a block diagram of the long and toggle decoder circuit 210 implemented to support the example of a four bit state code which codes three long signal states and six toggle signal state for each step. The four bits <b3,b2,b1,b0> of the state codes 208 are received at input nodes D3, D2, D1 and D0, respectively. The two bits <q1,q0> of the signal codes 212 are output at output nodes Q1 and Q0, respectively. The system clock CLK is received at a clock input node C. A combinational logic circuit 260 (for example, implemented using AND, NAND, NOT, OR and/or NOR logic gates) functions to decode the four bits of the state code 208 and generate signals 264 applied to the data inputs of a plurality of code flip flops (FF1, FF0) 262 and generate signals 266 applied to the data inputs of a plurality of toggle flip flops (FFta, FFFtb, FFtc) 268. Output signals 270 from the code flip flops 262 provide the two bits of the signal codes 212 at output nodes Q1 and Q0. The output signals 270 from the code flip flops 262 and the output signals 272 from the toggle flip flops 268 are fed back to the combinational logic circuit. The code flip flops 262 and the toggle flip flops 268 are clocked by the system clock CLK.

In the cases where the four bits of the state code 208 are coding any of the three long signal states (HV+, HV-, CLP), the combinational logic circuit 260 will decode the state code to generate the bits <q1,q0> for the signal code 212 which is latched by the code flip flops 262 over two cycles of the clock CLK. However, where the four bits of the state code 208 are coding any of the six toggle signal states (CLP/HV+, CLP/HV-, HV+/CLP, HV-/CLP, HV+/HV-, and HV-/HV+), the combinational logic circuit 260 will decode the state code to generate the bits <q1,q0> for the signal code which is latched by the code flip flops 262 for the first cycle of the clock CLK and one or more signal 272 outputs of the toggle flip flops 268 are set to logic "1" which indicates that a toggle operation is to be performed for the immediately following clock cycle. In response to the second cycle of the clock CLK, the combinational logic circuit 260 will decode the state code along with the set output(s) of the toggle flip flops 268 to generate the bits <q1,q0> for the signal code which is latched by the code flip flops 262 for the second cycle of the clock CLK, and the output(s) of the toggle flip flop FFt are set to logic "0".

The following Tables illustrate operation of the circuit 210 for steps 1-9 of the FIG. 7 waveform signal 16, where the left-most column identifies the signal nodes and the remaining columns each correspond to one cycle of the clock CLK:

|    | Step 1 |   | Step 2 |   | Step 3 |   | Step 4 |   | Step 5 |   |
|----|--------|---|--------|---|--------|---|--------|---|--------|---|
| D3 | 0      | 0 | 0      | 0 | 1      | 1 | 1      | 1 | 0      | 0 |
| D2 | 0      | 0 | 0      | 0 | 1      | 1 | 0      | 0 | 0      | 0 |
| D1 | 0      | 0 | 1      | 1 | 1      | 1 | 1      | 1 | 0      | 0 |
| D0 | 0      | 0 | 0      | 0 | 0      | 0 | 0      | 0 | 1      | 1 |
| Q1 | X      | 0 | 0      | 1 | 1      | 0 | 1      | 0 | 0      | 0 |
| Q0 | X      | 0 | 0      | 0 | 0      | 1 | 0      | 0 | 1      | 1 |
| 16 |        | CLP |     | HV− |     | HV− |     | HV+ | HV− | CLP | HV+ |

|    | Step 5 | Step 6 | Step 7 | Step 8 | Step 9 |   |
|----|--------|--------|--------|--------|--------|---|
| D3 | 0  0   | 1  1   | 1  1   | 1  1   | 1  1   | X |
| D2 | 0  0   | 0  0   | 1  1   | 1  1   | 0  0   | X |
| D1 | 0  0   | 0  0   | 0  0   | 0  0   | 0  0   | X |
| D0 | 1  1   | 0  0   | 1  1   | 0  0   | 1  1   | X |
| Q1 | 0  0   | 0  0   | 1  0   | 1  0   | 0  0   | 0 |
| Q0 | 0  1   | 1  0   | 0  1   | 0  0   | 1  1   | 0 |
| 16 | CLP HV+ | CLP HV− | HV+ HV− | CLP HV+ | HV+ | CLP |

The operation of the long and toggle decoder circuit 210 implemented to support the example of a four bit state code may be defined by logical statements. Consider that bits <b3,b2,b1,b0> are the state codes 208 read from the addressed memory location 204 and applied to inputs D3, D2, D1, D0, respectively.

For decoding any of the three long signal states (HV+, HV−, CLP), the operation of the combinational logic circuit 260 is defined by the following logical statement:

a) If b3=0→q1=b1, q0=b0 for two consecutive clock cycles.

In this case, a logic "0" state for bit b3 is a proxy indicating that the four bit state code is specific to a long signal state. The bits b1 and b0 specify which long state, with b1=0, b0=0 specifying the CLP state, b1=0, b0=1 specifying the HV+ state, and b1=1, b0=0 specifying the HV− state.

For decoding any of the six toggle signal states (CLP/HV+, CLP/HV−, HV+/CLP, HV−/CLP, HV+/HV−, and HV−/HV+), the operation of the combinational logic circuit 260 is defined by the following logical statements:

b) If (b3=1) AND (b1=0) AND (b2 XOR b0=1)→q1=b1, q0=b0 for the first clock cycle and q1=b1, q0=not(b0) for the second clock cycle;

c) If (b3=1) AND (b2=0) AND (b0=0)→q1=b1, q0=b0 for the first clock cycle and q1=not(b1), q0=b0 for the second clock cycle; and d) If (b3=1) AND (b2=1) AND (b1 XOR b0=1)→q1=b1, q0=b0 for the first clock cycle and q1=not(b1), q0=not(b0) for the second clock cycle.

In this case, a logic "1" state for bit b3 is a proxy indicating that the four bit state code is specific to a toggle signal state. The b1 and b0 bits have the logic state for the corresponding q1 and q0 bit for the first clock cycle.

With respect to the second clock cycle, the logic state of the b2 bit provides the toggle operation instruction. For the CLP/HV+ toggle signal state: the logic state "1" for bit b2 in the first state code <1100> indicates a toggle to the HV+ level for the second clock cycle. For the CLP/HV− toggle signal state: the logic state "0" for bit b2 in the first state code <1000> indicates a toggle to the HV− level for the second clock cycle. For the HV+/CLP toggle signal state: the logic state "0" for bit b2 in the first state code <1001> indicates a toggle to the CLP level for the second clock cycle. For the HV+/HV− toggle signal state: the logic state "1" for bit b2 in the first state code <1101> indicates a toggle to the HV− level for the second clock cycle. For the HV−/CLP toggle signal state: the logic state "0" for bit b2 in the first state code <1010> indicates a toggle to the CLP level for the second clock cycle. Lastly, for the HV−/HV+ toggle signal state: the logic state "1" for bit b2 in the first state code <1110> indicates a toggle to the HV+ level for the second clock cycle.

One skilled in the art knows how to design of the combinational logic circuit 260 with code flip flops 262 and toggle flip flops 268 to implement the logical statements a)-d) for the long and toggle decoder circuit 210. Furthermore, there may exist any number of possible circuit designs which satisfy the logical statements a)-d).

A truth table for operation of the long and toggle decoder circuit 210 implemented to support the example of a four bit state code which codes three long signal states and six toggle signal state for each step is as follows:

| b3 | b2 | b1 | b0 | code state | $1^{st}$ clock cycle | $2^{nd}$ clock cycle |
|----|----|----|----|------------|----------------------|----------------------|
| 0  | 0  | 0  | 0  | CLP        | q1 = b1 = 0          | q1 = b1 = 0          |
|    |    |    |    |            | q0 = b1 = 0          | q0 = b1 = 0          |
| 0  | 0  | 0  | 1  | HV+        | q1 = b1 = 0          | q1 = b1 = 0          |
|    |    |    |    |            | q0 = b0 = 1          | q0 = b0 = 1          |
| 0  | 0  | 1  | 0  | HV−        | q1 = b1 = 1          | q1 = b1 = 1          |
|    |    |    |    |            | q0 = b0 = 0          | q0 = b0 = 0          |
| 1  | 1  | 0  | 0  | CLP/HV+    | q1 = b1 = 0          | q1 = b1 = 0          |
|    |    |    |    |            | q0 = b1 = 0          | q0 = not(b0) = 1     |
| 1  | 0  | 0  | 0  | CLP/HV−    | q1 = b1 = 0          | q1 = not(b1) = 1     |
|    |    |    |    |            | q0 = b1 = 0          | q0 = b0 = 0          |
| 1  | 0  | 0  | 1  | HV+/CLP    | q1 = b1 = 0          | q1 = b1 = 0          |
|    |    |    |    |            | q0 = b0 = 1          | q0 = not(b0) = 0     |
| 1  | 1  | 0  | 1  | HV+/HV−    | q1 = b1 = 0          | q1 = not(b1) = 1     |
|    |    |    |    |            | q0 = b0 = 1          | q0 = not(b0) = 0     |
| 1  | 0  | 1  | 0  | HV−/CLP    | q1 = b1 = 1          | q1 = not(b1) = 0     |
|    |    |    |    |            | q0 = b0 = 0          | q0 = b0 = 0          |
| 1  | 1  | 1  | 0  | HV−/HV+    | q1 = b1 = 1          | q1 = not(b1) = 0     |
|    |    |    |    |            | q0 = b0 = 0          | q0 = not(b0) = 1     |

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A waveform generator, comprising:
a memory including a plurality of memory locations, wherein a sequence of memory locations within said plurality of memory locations stores a corresponding sequence of state codes specifying a waveform, where said sequence of state codes is read from the memory;
a long and toggle decoder circuit configured to decode each state code in the sequence of state codes read from the memory and generate a sequence of signal codes, wherein:
when the state code is a long code, the sequence of signal codes includes same signal codes corresponding to a signal level of the waveform; and
when the state code is a toggle code, the sequence of signal codes includes a first signal code corresponding to one signal level of the waveform and a second signal code corresponding to another signal level of the waveform; and
a signal decode circuit configured to decode the signal codes in the sequence of signal codes generated by the long and toggle decoder circuit and generate the waveform for output to include the signal levels corresponding to the decoded signal codes.

2. The generator of claim 1, wherein each state code corresponds to a two clock cycle step of the waveform, and wherein the first signal code specifies said one signal level of the waveform for a first cycle of the two clock cycle step and said second signal code specifies said another signal level of the waveform for a second cycle of the two clock cycle step.

3. The generator of claim 1, wherein said signal decode circuit includes a signal driver configured to generate signal levels for the waveform in response to the decoded signal code.

4. The generator of claim 1, wherein the long and toggle decoder circuit comprises:
a combinational logic circuit configured to detect that the state code is the toggle code, generate bits of the first signal code and generate a toggle signal;
a plurality of code flip flops that are clocked by a clock signal and configured to output the bits of the first signal code in response to a first cycle of the clock signal;
a toggle flip flop that is clocked by said clock signal and configured to latch the toggle signal in response to the first cycle of the clock signal;
wherein the combinational logic circuit is further configured, in response to the latched toggle signal and the state code, to generate bits of the second signal code; and
wherein the plurality of code flip flops are further configured to output the bits of the second signal code in response to a second cycle of the clock signal.

5. The generator of claim 4, wherein the combinational logic circuit is further configured to detect that the state code is the long code and generate bits of the signal code, and wherein the plurality of code flip flops are further configured to output the bits of the signal code in response to both the first cycle of the clock signal and the second cycle of the clock signal.

6. The generator of claim 1, wherein the state code includes a plurality of bits, and wherein a first bit of said plurality of bits has first logic state when the state code is the long code and a second logic state when the state code is the toggle code.

7. The generator of claim 6, wherein a set of bits of said plurality of bits in the state code is passed by the combinational logic circuit to generate the first signal code of the sequence of signal codes, and wherein the combinational logic circuit modifies the set of bits, when the first bit has the second logic state, to generate the second signal code of the sequence of signal codes.

8. The generator of claim 7, wherein a logic state of a second bit of said plurality of bits provides, when the first bit has the second logic state, information indicative of the modification to be made by the combinational logic circuit to the set of bits to generate the second signal code.

9. A system, comprising:
the waveform generator of claim 1; and
a transducer driven by the signal levels of the waveform.

10. The system of claim 9, wherein the system is a transmitter for an ultrasound imaging system.

11. The system of claim 9, further comprising a driver circuit configured to level shift the signal levels of the waveform for application to the transducer.

12. The system of claim 11, wherein the waveform generator further comprises a beamforming circuit configured to apply a delay shift to the waveform.

* * * * *